US005658631A

United States Patent [19]

Bernstein et al.

[11] Patent Number: 5,658,631

[45] Date of Patent: Aug. 19, 1997

[54] PRESSURE SENSITIVE LABELS

[76] Inventors: Robert Bernstein, 14 Deerfield Rd., Chappaqua, N.Y. 10514; Harlan Homes, 38 Lake Dr., Darien, Conn. 06820

[21] Appl. No.: 564,562

[22] Filed: Nov. 29, 1995

[51] Int. Cl.$^6$ .......................... B32B 7/14

[52] U.S. Cl. .......................... 428/42.1; 428/42.3; 428/202; 283/81

[58] Field of Search .......................... 428/42.3, 42.1, 428/41.8, 202; 283/81

*Primary Examiner*—Alexander Thomas
*Attorney, Agent, or Firm*—Levine & Mandelbaum

[57] ABSTRACT

A web of removable carrier labels, each having a self-adhering removable piggyback label, has a top label layer, a bottom support layer and an intermediate liner layer. The label layer has a pressure-sensitive adhesive coated surface and is die cut at the perimeters of each carrier label and the piggyback label within it. The liner layer has a release surface facing the pressure-sensitive adhesive coated surface of the label layer and is die cut about a perimeter geometrically similar to, and in registration with, the piggyback label die cut. The support layer is thereafter permanently adhered to the liner layer except at the die cut portion of the liner. The carrier label, piggyback label and die cut portion of the liner can be removed from the support web as a unit and adhered to a product such as a subscription piece or other substrate. The piggyback label can, thereafter, be peeled away from the carrier label and the underlying die cut liner portion and adhered to another surface.

4 Claims, 2 Drawing Sheets

PRESSURE SENSITIVE LABELS

BACKGROUND OF THE INVENTION

The invention relates to a dual pressure-sensitive label construction, i.e., a pressure-sensitive carrier label which carries a smaller pressure-sensitive piggyback label or coupon which can be removed from the larger label. Thus, the carrier label can be applied to a product, e.g., a subscription order form or other substrate having a surface for receiving a self adhering carrier label with a removable self adhering piggyback label, and at a later time the consumer can remove the piggyback label from the carrier label and apply the piggyback label to a separate surface.

Traditionally, this type of dual label construction is accomplished by employing a "piggyback" label construction. This involves a liner, or backing strip, having a silicone coating so that a carrier label with pressure sensitive adhesive on it can be removed from the liner. Overlying the liner is a second liner carrying pressure-sensitive adhesive on its face facing the liner, and having a silicone coating on its other face. A top layer overlies the second layer and has pressure-sensitive adhesive on its face facing the second liner. The other face of the third layer can be printed with the graphics and design of the carrier label and piggyback label.

In use, the second liner of the piggyback construction is die cut to create a series of larger carrier labels, and the top layer is printed and die cut to create the piggyback labels. The carrier labels can then be removed by labeling machinery and applied to a package or a package insert by means of the pressure sensitive adhesive on the back of the carrier label. At a later time, the consumer can remove the piggyback label from the carrier label and apply it to some other surface, such as a card to be returned to the manufacturer.

The prior art piggyback construction works satisfactorily. However, the piggyback stock must be purchased by the label printer from the manufacturer of the piggyback construction, and the piggyback stock is very expensive. It is not possible to manufacture piggyback stock on conventional printing and die cutting machinery.

A less expensive way has been suggested for providing a pressure-sensitive carrier label bearing a pressure-sensitive piggyback label. This method employs a conventional silicone-coated liner bearing a sheet having pressure-sensitive adhesive on it. This stock is much less expensive than piggyback stock. According to this method, the liner is die cut in a shape conforming to, but slightly larger than the piggyback label which will be printed and die cut. Then, the upper layer is printed and die cut to create the individual carrier labels, each carrier label also being die cut to create the individual piggyback labels. The die cutting of the piggyback labels is in registry with the die cut of the liner.

In use, when the carrier label is removed by the labeling machinery and applied to the package, the die cut portion of the liner remains adhered to the back of the piggyback label by means of the adhesive on the back of the piggyback label. Thus, although the carrier label is adhered to the package, the pressure sensitive adhesive bearing region of the piggyback label is not adhered to the package, because the die cut portion of the liner is between the piggyback label and the package. As a result, the piggyback label can later be removed and adhered to a separate surface.

The problem with this method is that removal of the die cut portion of the liner from the remainder of the liner greatly weakens the liner. Consequently, the liner has a tendency to break during application of the labels causing the label applicating machinery to jam, thereby stopping production.

SUMMARY OF THE INVENTION

The aforementioned problems of the prior art are overcome by the instant invention which provides for a dual type label construction, i.e., a pressure sensitive carrier label bearing a pressure sensitive piggyback label which can later be removed from the carrier label, using the less expensive two-layer stock, i.e., a silicone-coated liner bearing a pressure sensitive adhesive top layer, while avoiding the problem of liner breakage during application of the labels. This is accomplished by employing a third, support strip which is adhered to the face of the liner opposite the face of the liner which carries the top layer. In a sense, a variant of a piggy back construction is being created, but the bottom layer is not silicone coated, as in a piggyback construction. Therefore, the support strip becomes permanently secured to the liner. Even with the added cost of the support strip the total construction much less expensive than, i.e., typically one-third the cost of, piggyback stock. In fact, the total cost is about one-third of the piggyback stock.

According to the invention, the liner is die cut and the top layer is printed and die cut as described above with reference to the second method of creating the carrier label/piggyback label arrangement. The support strip is coated in a pattern with an adhesive. The pattern of the adhesive application to the support strip is such that the area of the support strip in registry with the die cut in the liner is left free of adhesive. As a result, the die cut portion of the liner stays with the carrier label and piggyback label when the carrier label is removed from the liner, but the remainder of the liner and the support strip remains permanently adhered together. Consequently, as the stock moves through the labeling machinery, the support strip provides sufficient strength to the support strip/liner combination so that breakage of the liner is avoided.

DESCRIPTION OF THE PREFERRED EMBODIMENT

Figure 1:
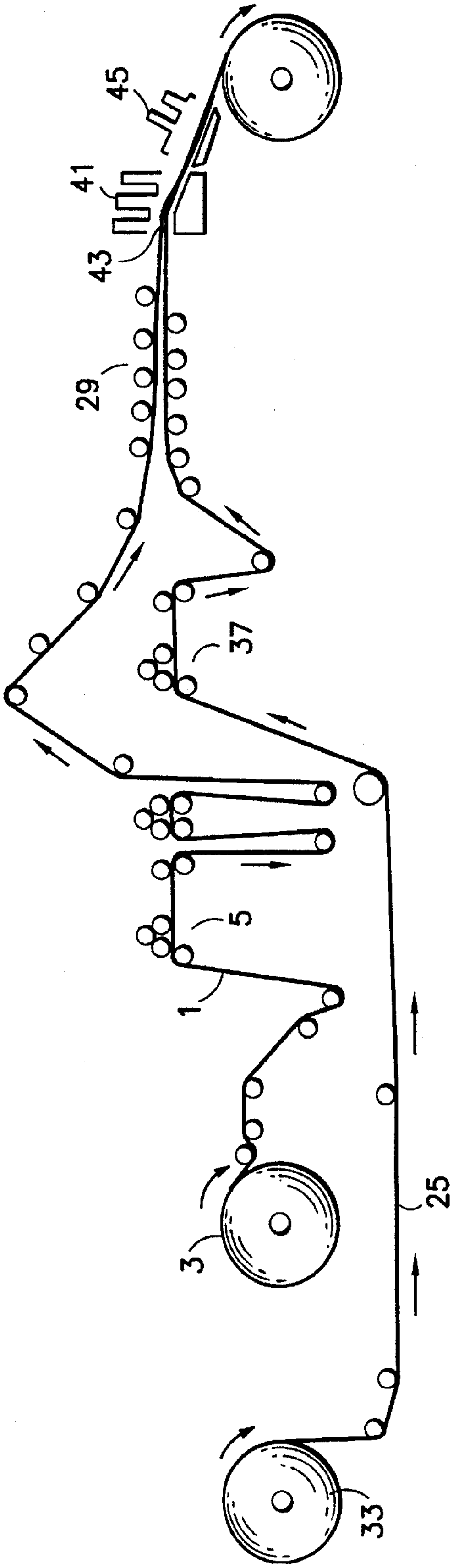
FIG. 1 is a schematic view showing the process by which pressure sensitive labels are made in accordance with the preferred embodiment of the invention.

Referring now to FIGS. 1–4 of the drawings, a continuous web of a conventional pressure sensitive separable two-layer stock 1 wound on a spool 3 is passed via rollers to a first die cutting station 5. The upper layer 15 of the two-layer stock 1, i.e., the label layer 15, as viewed in FIG. 1, has an upper surface 9 adapted to be repeatedly imprinted, uniformly along its length, with text and/or graphics of a desired carrier label 11, and of a piggyback label 13 situated within the perimeter of the carrier label 11. The lower layer of the two-layer stock 1 has an upper surface 23 coated with a silicone release formulation and serves as a liner 17 for the label layer 15. The label layer 15 of the two-layer stock 1 has a lower surface 19 that is uniformly coated with an adhesive 21 having a greater affinity for the lower surface 19 of the label layer 15 than for the silicone coated upper surface 23 of the liner 17 so that the liner 17 is releasably attached to the upper layer 15 by the adhesive 21.

The pressure sensitive adhesive preferably is water based and has a viscosity in the range of from 1200–6000 cps in order to facilitate its application in the label making process. The adhesive may be a BR-3958 aqueous system available from Basic Adhesives, Inc. and having a viscosity of 2000–3000 cps, or a BR-4105 aqueous acrylic emulsion. Alternatively, the adhesive may be a solid acrylate curable under ultraviolet radiation, e.g., Rad Cure UV1004 available from Rad-Cure Corporation and having a viscosity of 4,000–6,000 cps.

At the first die cutting station 5, the liner 17 is cut in a pattern having a perimeter geometrically similar to and slightly greater than the perimeter of the piggyback label 13. The web of separable two-layer stock 1 is then passed by rollers to a laminating station 29 to be Merged with and permanently adhesively attached to a support web 25 as will be further explained below.

The continuous support web 25 is wound on a spool 33 and passed via rollers to a permanent adhesive 35 application station 37 whereat a permanent, i.e., non-releasable, adhesive 35 is applied to the upper surface of the support web 25 as viewed in FIG. 1. The permanent adhesive 35 is applied to the support web 25 in a pattern so as to cover the entire upper surface of the web 25 except for uniformly spaced regions 39 having perimeters geometrically similar to and slightly greater than the perimeter of the pattern of the cut in the liner 17 made at the cutting station 5. The adhesive regions of the web 25 are spaced to be in registration with the piggyback labels 13 and their underlying cuts in the liner 17.

The web 25 is then transported to the laminating station 29 whereat pressure rollers urge the upper surface of the support web 25 against the lower surface 31 of the liner 17 thereby permanently cementing the liner 17 and support web together but enabling the die cut portions 27 of the liner 17 beneath the piggyback labels 13 to be separated from the support web 25 due to the absence of adhesive between the die cut portions 27 of the liner 17 and the support web 25.

The fully laminated stock 43, now having three layers, i.e., the label layer 15, liner 17, and support web 25 are then passed to two consecutive die cutting stations 41, 45, for die cutting the label layer 15. At the first label die cutting station 41, a cut is made in the label layer 15 in a pattern geometrically congruent to the perimeter of each carrier label 11 to be imprinted on the upper surface 9 of the label layer 15. At the second die cutting station 45 along the path of the laminated stock, the a cut is made in the label layer 15 in a pattern geometrically congruent to the perimeter of each piggyback label 13 to be imprinted on the upper surface 9 of the label layer 15.

Figure 4:
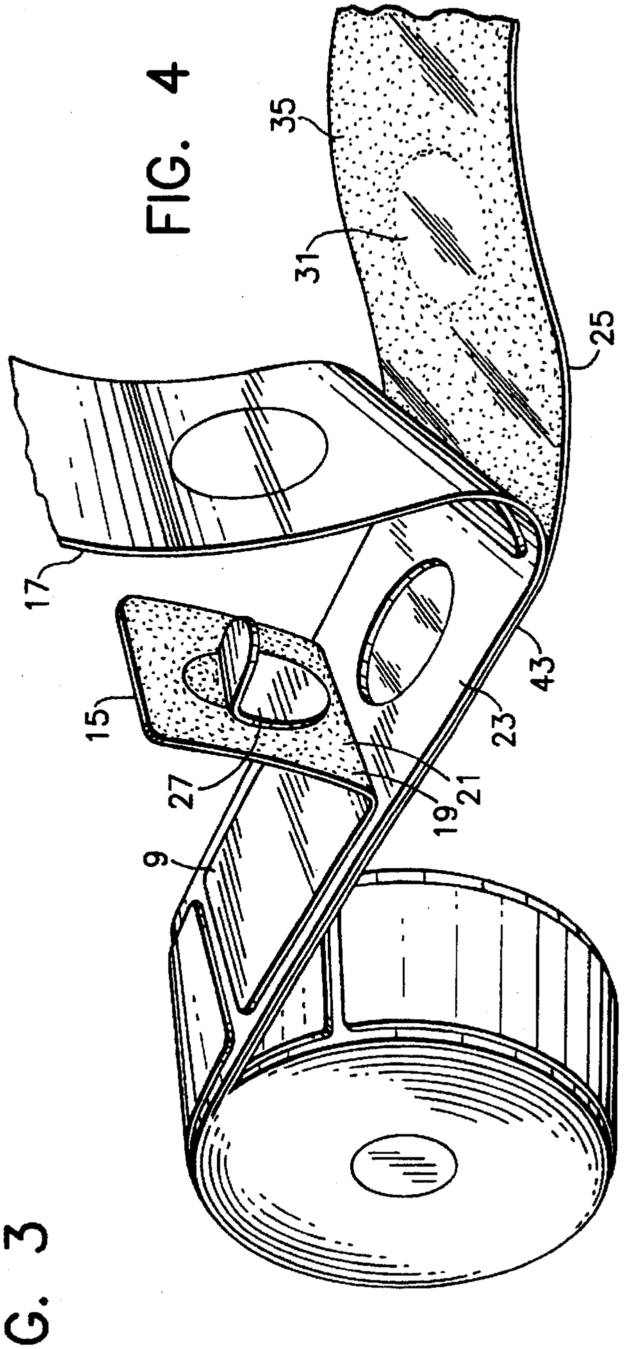
FIG. 4 is a perspective view of a strip of labels made in accordance with the preferred embodiment of the invention.
Figure 2:
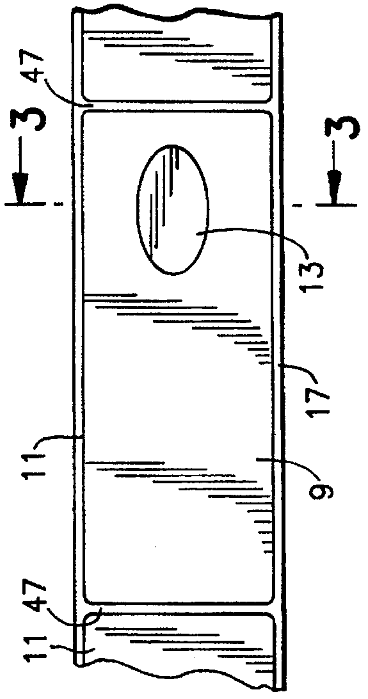
FIG. 2 is a sectional side view of a label in accordance with the preferred embodiment of the invention.
Figure 3:
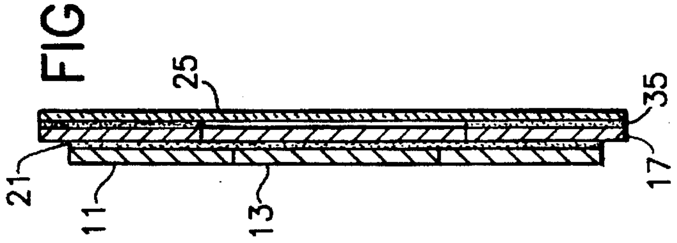
FIG. 3 is a fragmented plan view of strip of labels made in accordance with the invention.

As shown in FIG. 2, the carrier labels 11 are cut in a rectangular pattern having a width slightly less than the width of the label layer 15. There is also a slight end-to-end gap 47 be adjacent carrier labels 11 spaced along the longitudinal axis of the laminated stock. Adjacent one end of, and cut into, each carrier label 11 is an oval piggyback label 13, the oval cut having been made at the die cutting station 45. In the views of FIGS. 2, 3 and 4, the excess material of the label layer 15, i.e., the waste portion, outside of the carrier labels 11 has been removed from the liner 17 by peeling the waste portion away from the liner 17 to which it is removably attached, as is known in the art, thereby leaving only the carrier labels 11, with piggyback labels 13 contained therein, on the liner 17.

As can be seen in FIG. 4, the space between the carrier label 11 and piggyback label 13 included within it, on one hand, and the liner 17, on the other hand, is completely filled with the releasable adhesive 21. The space between the liner 17 and support web 25 is filled with the permanent adhesive 35 except for the region between the die cut 27 in the portion of the liner 17 beneath and in registration with the piggyback label 13, and the web 25.

Each carrier label 11 can be peeled from the liner 17 for attachment to a product such as a subscription piece or other substrate (not shown). As the carrier label 11 is peeled away from the liner 17, the die cut portion 27 of the liner 17, which is not cemented to the web 25, remains attached to the piggyback label 13 and is removed from the liner 17 and web 25. The carrier label 11, with piggyback label 13 included, can then be affixed to the product. Since the undersurface of the piggyback label 13 is entirely in contact with the die cut portion 27 of the liner 17 to which it is releasably attached, it too may be peeled away from the remainder of the carrier label 11 after the carrier label 11 has been affixed to the product.

As the carrier labels 11 are peeled from the liner 17 by automatic machinery known in the art, the waste portion of the liner 17 remains affixed to the support web 25 thereby imparting to the liner 17 the necessary support to prevent binding and snagging in the separation machinery from which prior art piggyback label/carrier label systems suffer.

It is to be appreciated that the foregoing is a description of a preferred embodiment of the invention to which variations and modifications may be made without departing from the spirit and scope of the invention. For example, the shapes of the carrier label 11 and piggyback label 13 need not be rectangular and oval but may be of virtually and geometric shape. Moreover, the position of the piggyback label 13 relative to the carrier label 11 may be varied from that shown.

What is claimed is:

1. A web of carrier labels containing piggyback labels comprising a top layer including said carrier labels and piggyback labels, a bottom layer and an intermediate layer, the top layer having an upper surface adapted for receiving an imprint of said carrier labels and piggyback labels, and a lower surface coated with a first adhesive;

the intermediate layer comprising a liner stock having an upper surface with a lesser affinity for said first adhesive than said lower surface of said top layer, and a lower surface whereby said top layer lower surface is releasably attached to said liner stock upper surface, said liner stock further having a cut in a pattern geometrically similar to and in registration with a perimeter of each one of said piggyback labels;

said bottom layer having an upper surface coated with an adhesive, except for an area of the bottom layer not coated with adhesive geometrically similar to and in registration with the perimeter of each liner stock cut, the lower surface of said liner stock being permanently attached to the adhesively coated portion of the upper surface of said bottom layer with said area of the bottom layer not coated with adhesive in registration with said liner stock cut.

2. A web of carrier labels containing piggyback labels according to claim 1 wherein said first adhesive is a water based adhesive.

3. A web of carrier labels containing piggyback labels according to claim 2 wherein said first adhesive has a viscosity in the range of 1200–6000 cps.

4. A web of carrier labels containing piggyback labels according to claim 1 wherein said first adhesive is curable by exposure to ultraviolet radiation.

* * * * *